US011940558B2

(12) United States Patent
Conley et al.

(10) Patent No.: US 11,940,558 B2
(45) Date of Patent: Mar. 26, 2024

(54) AUTOMATIC THREAT RECOGNITION FOR HD AIT

(71) Applicant: The Government of the United States of America, as represented by the Secretary of Homeland Security, Washington, DC (US)

(72) Inventors: Melissa Conley, Washington, DC (US); John Fortune, Clifton, VA (US); Michael Chandarlis, Woodbridge, VA (US); William Garrett, Morehead, KY (US); Brian Lewis, Washington, DC (US)

(73) Assignee: The Government of the United States of America, represented by the Secretary of Homeland Security, Washington, DC (US)

( * ) Notice: Subject to any disclaimer, the term of this patent is extended or adjusted under 35 U.S.C. 154(b) by 238 days.

(21) Appl. No.: 17/350,926

(22) Filed: Jun. 17, 2021

(65) Prior Publication Data
US 2023/0127343 A1 Apr. 27, 2023

Related U.S. Application Data

(60) Provisional application No. 63/065,214, filed on Aug. 13, 2020.

(51) Int. Cl.
*G01S 7/41* (2006.01)
*G06F 18/22* (2023.01)
*G06Q 50/26* (2012.01)

(52) U.S. Cl.
CPC .............. *G01S 7/412* (2013.01); *G06F 18/22* (2023.01); *G06Q 50/265* (2013.01)

(58) Field of Classification Search
CPC ........ G01S 13/887; G01S 7/412; G06F 18/22; G06Q 50/265; G06V 2201/05
See application file for complete search history.

(56) References Cited

U.S. PATENT DOCUMENTS

| | | | |
|---|---|---|---|
| 6,359,582 | B1 | 3/2002 | MacAleese et al. |
| 7,385,549 | B2 | 6/2008 | Lovberg et al. |
| 7,492,855 | B2 | 2/2009 | Hopkins et al. |
| 7,763,868 | B2 | 7/2010 | Ouchi et al. |
| 7,973,697 | B2 | 7/2011 | Reilly et al. |

(Continued)

*Primary Examiner* — Michael J Dalbo
(74) *Attorney, Agent, or Firm* — Lavanya Ratnam; Robert W. Busby; William Washington

(57) ABSTRACT

Described herein are examples of evaluating electromagnetic energy reflection data of security scans. In embodiments, a method to evaluate electromagnetic energy reflection data determines whether electronic information of a security scan contains an anomaly, and identifies an anomaly location in the electronic information corresponding to the anomaly. The method determines a subset of the electronic information corresponding to the anomaly location, determines anomaly attributes using the subset of the electronic information, and evaluates the anomaly attributes using a database of reference items by comparing anomaly attributes to respective reference characteristics of reference items or identity information. When a comparison meets the respective match criterion for the given reference item, the method assigns to the anomaly the respective identifier as an anomaly identifier.

23 Claims, 9 Drawing Sheets

(56) References Cited

U.S. PATENT DOCUMENTS

| | | |
|---|---|---|
| 8,319,682 B2 | 11/2012 | Smith |
| 8,350,747 B2 | 1/2013 | DeLia et al. |
| 8,355,538 B2 | 1/2013 | Reinpoldt, III |
| 8,547,274 B2 | 10/2013 | Reinpoldt, III |
| 8,674,875 B2 | 3/2014 | Carter et al. |
| 8,955,421 B1 * | 2/2015 | Kountotsis ............ F41A 17/063 89/1.11 |
| 10,209,387 B2 | 2/2019 | Kayano et al. |
| 10,361,802 B1 | 7/2019 | Hoffberg-Borghesani et al. |
| 2008/0212742 A1 * | 9/2008 | Hughes ................... G01T 1/167 378/98.12 |
| 2010/0166322 A1 * | 7/2010 | Madruga .............. G01V 5/0008 382/218 |
| 2010/0308108 A1 * | 12/2010 | Choi ........................ G07C 9/10 235/382 |
| 2013/0121529 A1 * | 5/2013 | Fleisher .................. G01S 7/412 382/103 |
| 2016/0216371 A1 * | 7/2016 | Ahmed ................... G01S 13/89 |
| 2017/0169528 A1 * | 6/2017 | Kundu .................. H04L 65/765 |
| 2020/0193666 A1 * | 6/2020 | Cinnamon ............ G06T 1/0007 |
| 2020/0371227 A1 * | 11/2020 | Malhi ................... G01S 13/887 |
| 2022/0335724 A1 * | 10/2022 | Ariyoshi ............... G01S 13/867 |
| 2023/0031219 A1 * | 2/2023 | Ezrahi .................... B64F 1/368 |

\* cited by examiner

Obtain Security Scan
Detect Anomaly

Determine Anomaly Attributes

Analyze Anomaly Attributes

Output Anomaly Identifier and Status Identifier

AUTOMATIC THREAT RECOGNITION FOR HD AIT

CROSS-REFERENCE TO RELATED APPLICATIONS

This application is a non-provisional that claims the benefit of priority from U.S. Provisional Application No. 63/065,214 entitled "AUTOMATIC THREAT RECOGNITION FOR HD AIT," filed on Aug. 13, 2020, the disclosure of which is incorporated by reference in its entirety.

STATEMENT OF GOVERNMENT INTEREST

This invention was made with U.S. Government support under contract HSHQDC-13-D-00038, Task Order No. HSHQDC-17-J-00271, awarded by the United States Department of Homeland Security. The Government has certain rights in the invention.

FIELD

The discussion below relates generally to categorizing anomalies detected in security scans of human subjects.

BACKGROUND

Airports, other travel departure/arrival venues or locations requiring screening for entry into a restricted or controlled space include security checkpoints to perform security operations, including the screening of human subjects. As part of such screening, security checkpoints obtain security scans of subjects and apply a form of automatic analysis to the security scans, referred to herein as automatic threat recognition (ATR). The ATR can detect anomalies in the security scans. To investigate the anomalies, agents at the security checkpoints can perform manual screening of the subjects corresponding to the detected anomalies. However, manual screening is time-consuming, requires additional security checkpoint floorspace and staffing, and introduces inefficiencies to security checkpoint operations.

SUMMARY

Described herein are embodiments to categorize the anomalies of security scans. The systems, devices, techniques, and approaches described herein can be used in a variety of security screening situations including, but not limited to, mass transit, border security, correctional facilities, department of motor vehicles, sporting events, testing centers, and so on as understood by one of skill in the art.

In embodiments, a method to evaluate electromagnetic energy reflection data includes determining whether electronic information of a security scan contains an anomaly. When the electronic information contains an anomaly, the method further includes identifying an anomaly location in the electronic information corresponding to the anomaly, and determining a subset of the electronic information corresponding to the anomaly location. The method also includes determining anomaly attributes using the subset of the electronic information, and evaluating the anomaly attributes using a database of reference items. A given reference item has a respective identifier, respective reference characteristics, and a respective match criterion indicating one or more of the respective reference characteristics. The evaluating of the anomaly attributes includes making a comparison between the anomaly attributes and the respective reference characteristics of the given reference item. When a result of the comparison meets the respective match criterion for the given reference item, the method includes assigning to the anomaly the respective identifier as an anomaly identifier.

In other embodiments, an apparatus to evaluate electromagnetic energy reflection data includes a computer system, which includes a processing system having a hardware processor adapted to perform a predefined set of basic operations by loading corresponding ones of a predefined native instruction set of codes constituting a set of instructions selectable for execution by the hardware processor. The computer system also includes a memory accessible to the processing system, and various logic, including anomaly identifying logic and anomaly analyzer logic. The anomaly identifying logic, stored in the memory, includes instructions selected from the predefined native instruction set of codes of the hardware processor, adapted to operate with the processing system to identify an anomaly and an anomaly location using electronic information of a security scan. The anomaly analyzer logic, stored in the memory, includes instructions selected from the predefined native instruction set of codes of the hardware processor. The instructions of the anomaly analyzer logic are adapted to operate with the processing system to determine a subset of the electronic information corresponding to the anomaly location, determine anomaly attributes using the subset of the electronic information, and evaluate the anomaly attributes using a database of reference items. A given reference item has a respective identifier, respective reference characteristics, and a respective match criterion indicating one or more of the respective reference characteristics. The anomaly analyzer logic further includes instructions adapted to make a comparison between the anomaly attributes and the respective reference characteristics of the given reference item. When a result of the comparison meets the respective match criterion for the given reference item, the instructions of the anomaly analyzer logic are adapted to assign to the anomaly the respective identifier as an anomaly identifier. The computer system further includes a user interface adapted to output, when the result of the comparison meets the respective match criterion, the anomaly identifier.

Anomaly analysis is discussed throughout this application in a security scan context. However, the principles of this disclosure apply to other situations and environments. Other features and aspects of various embodiments will become apparent to those of ordinary skill in the art from the following detailed description which discloses, in conjunction with the accompanying drawings, examples that explain features in accordance with embodiments. This summary is not intended to identify key or essential features, nor is it intended to limit the scope of the invention.

BRIEF DESCRIPTION OF THE DRAWINGS

The drawing figures illustrate one or more implementations in according with the teachings of this disclosure, by way of example only, not by way of limitation. In the figures, like reference numbers refer to the same or similar elements. It will be understood that the drawings are not necessarily to scale.

DETAILED DESCRIPTION

Figure 1:
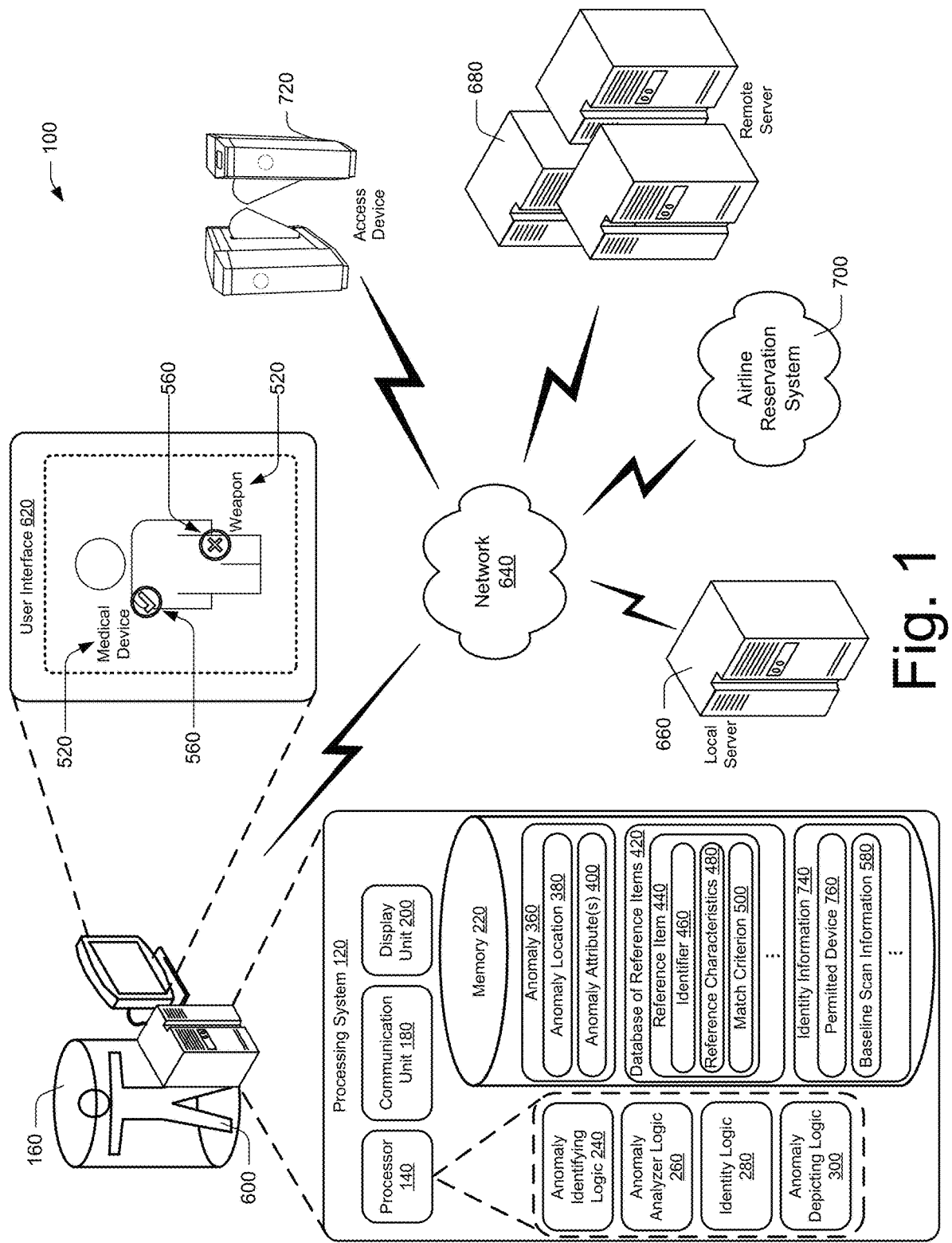
FIG. 1 illustrates a system to output at least one anomaly identifier in accordance with embodiments and the teachings discussed further in this disclosure.

The detailed description below discloses embodiments that may ameliorate the foregoing drawbacks associated with manual screening. Anomaly identification technology is used in a security scanning environment to enable anomaly identification and anomaly depiction while respecting the privacy of passengers, referred to herein as subjects.

Various technologies are used to screen subjects. Advanced Image Technology (AIT) is a technology that uses millimeter wave energy to screen subjects. AIT is capable of detecting items that are prohibited (such as weapons or other threats that pose a danger), even if such items are hidden beneath a subject's clothing. AIT also detects anomalies, or other detected information that warrants additional investigation. Another technology, used in conjunction with AIT, is Automatic Threat Recognition (ATR). ATR identifies a general location of such anomalies, as detected on the subject.

ATR does not provide a depiction of all scan information from a subject, because doing so would risk violating the privacy of the subject. Instead, ATR software outputs, on a graphical user interface (GUI), a genericized human figure (e.g., a gingerbread man) including a representation of the location of the anomaly. Such output visually informs agents of the general area on the subject where the anomaly can be found. The ATR software does not automatically resolve the anomaly, or perform an identification of the anomaly. Accordingly, agents are not able to visually resolve the anomaly, particularly in cases of false alarms. Rather, the ATR software merely identifies the location of the anomaly. An agent is needed to physically investigate the indicated general area of the subject, such as by conducting a pat-down or rescreening of the subject. Such physical investigations are often inconvenient and may be inefficient.

The embodiments described herein take advantage of greatly improved AIT, or high-definition AIT (HD-AIT), and use various threat item identification computational approaches to identify anomalies. Embodiments judge whether anomaly attributes indicate that the anomaly is prohibited (such as a weapon), permitted (such as human tissue or a medical device), or unidentifiable. Embodiments also depict unidentifiable anomalies while respecting the privacy of subjects. For example, embodiments can adjust their performance in view of identity information about a subject. The identity information can include privacy information about the subject, such as private area information specifying which areas of the subject that the subject considers to be private. Embodiments can use the privacy information to adjust the extent of what underlying electronic information the system permits to be depicted when visualizing anomalies. Such adjustment can be made independent of how the subject is scanned. For example, the entire subject can be scanned, but the system can mask, blur, or otherwise prevent portions of the collected information from being publicly visible. Such adjustments are customizable on a per-subject basis, in view of the identity information of that particular subject. Embodiments also can depict a subset of scan data of the anomaly that is inconsistent with human tissue. Such features provide agents advanced knowledge of what type of item has been detected as an anomaly, so that agents can tailor their response to those types of items. In other embodiments, the system positively identifies anomalies as permitted items, without needing to burden agents with indications of the anomaly. Accordingly, embodiments provide greater efficiency and improved experiences for the subjects.

FIG. 1 illustrates a system 100 to output at least one anomaly identifier 520 according to an embodiment. The system 100 includes a scanning system 160, a processing system 120, and a user interface 620. In this embodiment, the processing system 120 communicates via network 640 with local server 660, airline reservation system 700, remote server 680, and access device 720.

When operated, the scanning system 160 obtains scan data pertaining to a subject 600. For example, the scanning system 160 obtains a security scan by directing electromagnetic energy toward the subject 600 and evaluating electromagnetic energy reflection data returning to the scanning system 160. The scanning system 160 generates electronic information corresponding to the security scan. The scanning system 160 provides the electronic information to a processing system 120.

The processing system 120 includes processor 140, communication unit 180, display unit 200, and memory 220. The communication unit 180 is representative of one or more devices adapted to electronically communicate information to and from other devices and components, including in instances those included in or external to the system. Example communication units include but are not limited to wireless devices (such as an 802.11 compliant unit), wired devices based on Ethernet or other such communication interfaces, near field communication (NFC) transceivers, and/or a cellular communication transceiver. Example 802.11 compliant modems/cards include but are not limited to those compliant with 802.11n, 802.11ac, 802.11ad, 802.11ah, 802.11aj, 802.11ax, and the like wireless local area network standards promulgated by the Institute of Electrical and Electronics Engineers (IEEE), New York, New York. As will be appreciated, the communication units 180 can be used in a variety of combinations and arrangements based on operational parameters and design preference, to communicate with system components and resources (e.g., third-party computing resources) external to the system 100. In embodiments, communication unit 180 includes a combination of hardware and software. The processor 140 supports the communication unit 180 in the illustrated embodiment. In other instances, a dedicated processor may be included in or with the hardware that forms the communication unit 180. Other combinations are applicable to the embodiments taught by this disclosure.

Although a single processor 140 and memory 220 are illustrated, the processing system 120 in other embodiments is constructed with multiple processors 140 and memories 220 based on design preference. The processor 140 is representative of hardware configured to process computer executable instructions, such as a central processing unit that executes a program of instructions. In embodiments, the processor 140 implements an operating system which is a set of computer executable instructions that allows the processor 140 to perform specialized instructions according to a program run on the operating system and processor platform as described consistent with this disclosure.

Memory 220 is representative of wide varieties, types, and combinations of memory suitable for storing information in an electronic format. Example memory includes, but is not limited to, random access memory (RAM), hard disk memory, removable medium memory, flash storage memory, and other types of computer-readable media including non-transitory data storage. For example, local memory 220 stores a variety of information obtained from the scanning system 160, the network 640, and so forth. Although memory 220 is illustrated as being within the processing system 120, in some embodiments the memory 220 includes an array of memory devices, such as a RAID configuration.

The processing system 120 is illustrated including various modules or logic that are representative of hardware or software that are constructed to provide the described capabilities, such as through execution of a program of instructions that, when implemented by hardware, function in the described manner. In embodiments, modules or logic are logical combinations of hardware and software designed to electronically perform the described functions and support objects (instances), such as through operation of instructions that cause the hardware to provide the described functions. In embodiments, the individual modules or logic interact through one or more application program interfaces (APIs) that permit interaction and passing of information between the hardware and software forming a particular module or logic with that of other modules and data structures, e.g., databases. In some instances, the modules or logic, or subgroups of modules or logic, are integrated into a unitary program of instructions based on design preference. The software can be embodied as a program of instructions stored in memory (e.g., non-transitory memory) that are accessible to the processor 140 at runtime, or execution. In instances, hardware supporting the modules or logic includes an operating system, which can be stored in memory 220, on which the described modules or logic function.

Referring back to the processing system 120, the included processor 140 is associated with modules or logic labeled as anomaly identifying logic 240, anomaly analyzer logic 260, identity logic 280, and anomaly depicting logic 300. The memory 220 is associated with structures including anomaly 360, database of reference items 420, and identity information 740. The functionality of such modules, logic, and structures is described in further detail below. While shown and described as individual modules, logic, and structures, the supporting hardware or software can be configured as an integrated program of instructions to provide the described functionality, such as through the use of application program interfaces (APIs) that permit individual programs to interact, such as by passing information to one or more other programs and providing one or more graphical user interfaces (GUIs) output on a display.

The system 100 is communicatively coupled to the network 640, e.g., via communication unit 180 of the processing system 120. The processing system 120 is configured to communicate via the network 640 with other systems, including one or more of the illustrated local server 660, remote server 680, airline reservation system 700, access device 720, and other systems.

The processor 140 is associated with the operation of anomaly identifying logic 240, anomaly analyzer logic 260, identity logic 280, and anomaly depicting logic 300. The communication unit 180 is associated with establishing communications over network 640. The display unit 200 is associated with providing output to the user interface 620. The memory 220 stores various information for the processing system 120, including information corresponding to anomaly 360, database of reference items 420, and identity information 740. The anomaly 360 includes anomaly location 380 and anomaly attributes 400. The database of reference items 420 includes one or more reference items 440. A given reference item 440 is associated with an identifier 460, reference characteristics 480, and match criterion 500. Identity information 740 includes permitted device 760 and baseline scan information 580.

The processing system 120 determines whether the electronic information of the security scan contains an anomaly 360, and determines additional information about the anomaly 360. In an embodiment, the processing system 120 initializes a data structure to store information about the anomaly 360, such as the electronic information of the security scan, a subset of the electronic information pertaining to the anomaly location 380, anomaly attributes 400, an anomaly identifier, a status identifier, and the like. Upon creation of such a data structure, the various fields of the data structure may be initialized as undefined or none, until the processing system 120 populates the various fields during scanning, identifying, analyzing, or other procedures performed on the anomaly as described herein.

In embodiments, the processing system 120 directs various logic in order to process the anomaly 360. Anomaly identifying logic 240 identifies an anomaly location 380 in the electronic information corresponding to the anomaly 360. Anomaly analyzer logic 260 determines a subset of the electronic information which corresponds to the anomaly location 380. The anomaly analyzer logic 260 then determines anomaly attributes 400, using that subset of the electronic information. The anomaly analyzer logic 260 compares the anomaly attributes 400 to the database of reference items 420. Identity logic 280 determines identity information 740 of the subject 600. The anomaly depicting logic 300 directs the display unit 200 to output status identifier 560, anomaly identifier 520, or other information via the user interface 620.

More specifically, the anomaly analyzer logic 260 evaluates the anomaly attributes 400 in view of the database of reference items 420. For example, the anomaly analyzer logic 260 compares the anomaly attributes 400 to reference items 440 of the database of reference items 420. A given reference item 440, of the database of reference items 420, includes a respective identifier 460, respective reference characteristics 480, and a respective match criterion 500. The match criterion 500 indicates one or more of the respective reference characteristics 480, and can include details on how to compare the anomaly attributes 400 to the indicated reference characteristics 480. Accordingly, the anomaly analyzer logic 260 compares the anomaly attributes 400 and the respective reference characteristics 480, according to the match criterion 500 of the given reference item 440. When a result of the comparison meets the respective match criterion 500 for the given reference item 440, the anomaly analyzer logic 260 assigns to the anomaly 360 the respective identifier 460 as an anomaly identifier 520. For example, when the anomaly attributes 400 match a weapon reference item 440, the processing system 120 directs the user interface 620 to display "weapon" as an anomaly identifier 520 for the anomaly 360. In an embodiment, the anomaly analyzer logic 260 repeats such analysis for all detected anomalies 360 associated with a given security scan.

In an embodiment, the processing system 120 obtains the anomaly attributes 400 by performing a dielectric characterization of the portion of the security scan's electronic information pertaining to the anomaly location 380. The anomaly analyzer logic 260 compares the dielectric characterization to the database of reference items 420, which can include various items and/or categories of items, such as explosive threats, metallic items (e.g., weapons), non-metallic weapons, skin, other forms of human tissue, water, or other items. In other embodiments, the processing system 120 can be programmed or configured to exclude or filter certain anomalies based on information that confirms anomaly 360 is not a threat. In an embodiment, the processing system 120 performs similar types of comparisons against the database of reference items 420 as described above, and notes which reference items 440 are excluded by the anomaly attributes 400. For example, the processing system 120 excludes the possibility that a given anomaly 360 is an explosive (having one range of dielectric constant anomaly attribute 400), based on identifying the anomaly 360 as being consistent with a metallic weapon such as a knife (having a non-overlapping range of dielectric constant anomaly attribute 400). Accordingly, the processing system 120 enables not only the detection of anomalies 360, but also the identification of anomalies 360 (e.g., what type of anomaly 360 per the anomaly identifier 520), and whether the anomaly 360 is prohibited or permitted (e.g., the status identifier 560 indicating a pass status or a fail status).

In an embodiment, based on anomaly attributes 400 corresponding to a non-threat, the processing system 120 assigns the anomaly 360 a non-threat status identifier 560. The processing system 120 also determines what kind or type of non-threat. For example, the processing system 120 assigns, as indicated in the database of reference items 420, a corresponding anomaly identifier 520 indicating human tissue, water, medical device, clothing, commonly carried electronic items, and the like. The processing system 120 similarly assigns a status identifier 560, indicating pass or fail, or the equivalent (e.g., permitted or prohibited).

The anomaly identifier 520 and status identifier 560 enable an agent or other mode for secure screening at a checkpoint to quickly and efficiently review, for example, the user interface 620, to determine whether a further form of screening, e.g., manual screening pat-down, is needed for evaluating the subject 600. Furthermore, embodiments of the processing system 120 use such indications to task the agent with a specific objective to achieve during the manual screening pat-down. For example, rather than indicating a generic anomaly, the processing system 120 indicates a specific type of anomaly. In an example, the processing system 120 indicates a metallic weapon on the subject 600, based on analyzing the anomaly attributes 400. This indication tasks the agent with locating that specific type of anomaly, before clearing the subject 600. Such additional information about the anomaly 360 assists agents in finding, on the subject's body 600, the specific anomaly threat indicated in the user interface 620. Such assistance reduces the risk that the agent would find another innocuous item, mistake it for the legitimately dangerous or prohibited item, and inadvertently clear the subject without finding the indicated anomaly 360. Thus, even if the processing system 120 is not able to automatically clear an alarm generated by an anomaly 360 (e.g., as generated by a false alarm), the user interface 620 of the processing system 120 provides additional helpful information and tasks that agents or screening systems are to perform, for example, manual screening pat-downs, or other forms of additional security checks to locate specific types of contraband or initiate further actions to address the threat. Such assistance enhances the security of checkpoint screening operations, ensuring that a given type of anomaly does not inadvertently slip through security.

The processing system 120 need not perform a detailed analysis on the electronic information corresponding to the entire security scan. Rather, the anomaly analyzer logic 260 analyzes just the subset of the electronic information corresponding to the anomaly location 380, conserving valuable resources without creating privacy issues. Such an approach avoids the difficulty and computational expense associated with performing detailed analysis on the electronic information corresponding to the entire security scan.

The identity logic 280 enables the processing system 120 to access identity information about the subject 600, e.g., identity information 740 stored at an airline reservation system 700, on a local database (at local server 660), or on a remote database (at remote server 680). Such identity information accessible by the processing system 120 includes privacy information, risk-based information, pre-check information, metadata information, medical information, and volunteered information from subjects. Such information also includes publicly-available information, or information otherwise obtainable without being volunteered by the subject.

Such identity information 740 may be generated and captured locally, e.g., when a subject 600 interacts with third-party travel companies, airlines, airport security, or other points of contact related to travel in which a subject 600 provides information. In an embodiment, the processing system 120 captures item characteristics of an item that the subject 600 is permitted to carry through security, such as a medical device or other item. The captured item characteristics are stored as a type of identity information 740 for the subject, which the processing system can use for future comparisons against anomaly attributes 400 detected for that subject 600. The subject 600 also can provide, in advance, information about items or other conditions (such as artificial limbs or implants) particular to that subject 600, which might be detected as an anomaly 360. The processing system 120 can include such details for classifying detected anomalies 360, when that particular subject 600 eventually arrives for security scanning. In an embodiment, the processing system 120 performs a database lookup to determine specific reference characteristics 480, as they would be detected in the scanning system 160, which correspond to the item description as provided by the subject 600. For example, the subject 600 indicates a make and model of a glucose pump medical device, and the processing system 120 accesses a database (local or remote) of reference items to retrieve particular reference characteristics for that type of permitted item. The processing system 120 supplements the identity information 740 for the subject 600 by indicating the particular medical device and its reference characteristics. Such identity information 740 may be stored locally, e.g., in a database of reference items 420, or as a separate database or other data storage structure. The processing system 120 similarly can capture baseline scan information that is particular to the subject 600, including any body tissue that might otherwise be detected initially as an anomaly. Such identify information 740 may be rendered inaccessible in the local server 660 or database of reference items 420 to maintain privacy of the subject 600. When the corresponding subject 600 is being processed in the future, the corresponding identity information 740 is rendered accessible only during processing of that subject 600. By staging such information, embodiments of the processing system 120 enable greater security checkpoint efficiencies by reducing alarms, and corresponding increases in user experience and satisfaction of subjects 600.

In an embodiment, the processing system 120 uses the identity information 740 to adjust what areas of the subject 600 are regarded as private. For example, the processing system 120 uses the identity information 740 to identify the subject's height. The processing system 120 regards certain areas as private, corresponding to the height. In contrast, the processing system 120 does not regard the same areas as private for subjects 600 whose identity information 740 indicates a different height. The processing system 120 can make similar adjustments based on other aspects of the identity information 740. Embodiments also can use other portions of the identity information 740, e.g., private area information, to adjust the extent of what underlying electronic information the processing system 120 permits to be depicted when visualizing anomalies. Such adjustment is customizable on a per-subject basis, in view of the identity information 740 of that particular subject 600. In the aforementioned example, the processing system 120 has more freedom to direct the user interface 620 to depict the anomaly along with an entire chest region of a male subject 600 underlying the anomaly, in contrast to female subjects where the anomaly information needs to be carefully distinguished from human tissue information before depicting the anomaly information. The identity information 740 includes various other information that the processing system 120 uses to determine whether scan data corresponds to a private area of the subject 600. For example, the subject 600 volunteers identity information 740 in advance of undergoing scanning, e.g., upon reserving a flight or upon registering for a registered traveler program. Such volunteered identity information 740 may indicate that the subject 600 carries a permitted device 760, such as a medical device, artificial limb, implant, electronic item, or the like. The identity information 740 also is used to indicate, e.g., that the subject 600 considers the medical device to be private (e.g., expressing the desire to avoid revealing the medical device to traveling companions or the public). Accordingly, in an embodiment, the processing system 120 directs the user interface 620 to not display the anomaly identifier 520 for the private medical device, or does not depict the scan of the medical device itself. Rather, the processing system 120 directs the user interface 620 to display a status identifier 560 indicating that the medical device has a pass status. In an embodiment, the subject 600 is free to indicate via the identity information 740 whatever areas are regarded by the subject 600 as private, independent of objective standards regarding privacy. Such identity information 740 provided by the subject 600 enables the processing system 120 to direct the user interface 620 to avoid publicly displaying information that the subject 600 considers to be private. However, in embodiments, the processing system 120 analyzes such areas regardless of their private indication, to analyze any anomalies 360.

Embodiments enable the status identifier 560 to be assigned independently of the anomaly identifier 520. Accordingly, embodiments allow for anomalies to be given a pass status identifier 560, even if the anomalies are not identified with a given anomaly identifier 520. In an example, a subject 600 may have a human tissue abnormality that is deemed safe to pass through security (e.g., based on a previous visit where the abnormality was manually verified as safe and recorded in baseline scan information specific to that subject 600). Upon arriving for scanning, the processing system 120 recognizes the abnormality as being consistent with the subject's identity information 740, without needing to specifically classify the abnormality as a specific type of anomaly 360.

In embodiments, the identity logic 280 also accesses the local server 660 or remote server 680 to access baseline scan information 580 for the particular subject 600, e.g., based on the subject 600 previously visiting the scanning system 160. The baseline scan information 580 includes details specific to the subject 600, such as specific body morphology or implanted medical devices that would otherwise be detected as an anomaly 360. In another embodiment, baseline scan information may be exchanged between different agencies, e.g., the processing system 120 for one agency may retrieve baseline scan information 580 from another agency via network 640. Accordingly, the processing system 120 determines whether any detected anomalies 360 are consistent with the baseline scan information 580. If so, such anomalies 360 can be cleared as non-threats.

In an embodiment, the processing system 120 uses the identity information 740 to adjust whether to classify an anomaly 360 as permitted or prohibited, and to identify additional information about the anomaly 360. For example, the processing system 120 determines that the identity information 740 for a subject 600 indicates an elderly person. The processing system 120 then interprets anomalies 122 more leniently for that person (e.g., whether to flag as anomalous, and/or whether to categorize an anomaly as a threat), compared to how the processing system 120 would interpret anomalies for a subject 600 of younger age. In an embodiment, for elderly subjects 600, the processing system 120 increases the likelihood of interpreting an anomaly 360 as a medical device, and decreases the likelihood of interpreting the anomaly 360 as a weapon, compared to young healthy subjects 600. The processing system 120 achieves such adjustments by, e.g., applying a threshold adjustment to a threshold percentage match criterion 500, as described with reference to FIG. 6 below. Furthermore, subjects 600 pre-register and provide or volunteer additional identity information 740 to be used by the processing system 120 in analyzing and identifying anomalies 360. For example, subjects 600 can provide identity information 740 indicating a metal plate, physical abnormality, or other medical or personal characteristic of the subject 600, that might otherwise be flagged as an anomaly 360.

Subjects 600 also can provide identity information 740 indicating membership in a trusted traveler program. An embodiment of the processing system 120 classifies anomalies 360 of such subjects 600 using different thresholds, based on a membership status of the subject 600, or other indications that the subject 600 is trustworthy. Embodiments can adjust the various threshold match criteria 500 when evaluating that subject's corresponding anomaly attributes 400, to adjust how the system classifies anomalies 360 for subjects deemed to have trustworthiness.

Embodiments of processing system 120 use other types of identity information 740, including identity information 740 that is not directly provided by the subject 600. Such other types of identity information 740 include risk-based information, such as whether the subject 600 has a criminal history, poor credit, or other information. Embodiments of the processing system 120 can retrieve such information from credit rating agencies or other databases available via network 640.

In an embodiment, the processing system 120 uses information unrelated to an identity of a subject to affect how anomalies 360 are analyzed. For example, the processing system 120 checks the local server 660 for an indication whether the travel venue indicates a desired checkpoint throughput. If so, the processing system 120 adjusts the thresholds for classifying anomalies generally. Such adjustments cause corresponding increases or decreases in the expected time needed to classify a given anomaly. The processing system 120 can monitor the aggregate effect of such adjustments, ensuring that security checkpoint performance is consistent with security goals. For example, the processing system 120 may adjust thresholds to more quickly classify anomalies, or to take relatively more time to classify anomalies, as being permitted or prohibited. A similar approach may be used when determining types of anomalies such as medical devices, weapons, and the like.

Returning to the various logic of the processing system 120, the anomaly depicting logic 300 provides additional details of the anomaly 360, to assist an agent in identifying the anomaly 360 without raising privacy issues. Privacy issues may arise, depending on how much of a security scan is depicted by the user interface 620. Accordingly, embodiments distinguish whether portions of the subset of electronic information at the anomaly location 380 are consistent with human tissue. If not, the anomaly depicting logic 300 directs the user interface 620 to depict such non-human portions. Accordingly, an agent performs manual visual review of the depicted portions, absent the depiction of human tissue. Such manual visual review enables likely resolution of the anomaly 360, without a need for a secondary screening manual pat-down of the subject 600. Furthermore, because human tissue is not depicted, privacy issues do not arise. Furthermore, the display unit 200 directs the user interface 620 to display an approximation of the subject 600, thereby maintaining the privacy of the subject 600. The user interface 620 uses iconography or other symbolism to display an indication of the anomaly location 380, e.g., a symbol to represent the anomaly 360 and an indication of permitted or prohibited.

In an embodiment, the processing system 120 is configured to selectively depict at least a portion of the anomaly 360. For example, the anomaly depicting logic 300 of the processing system 120 directs the display unit 200 to selectively depict the subset of electronic information corresponding to the anomaly location 380. More specifically, the display unit 200 causes the user interface 620 to selectively retain or discard electronic information from the anomaly depiction on the user interface 620, on a pixel-by-pixel or voxel-by-voxel basis. For example, electronic information corresponding to human tissue is not depicted on the user interface 620. Accordingly, embodiments generate an image of the anomaly 360 without violating the privacy of the subject 600, e.g., by not including pixels or voxels depicting a private area of the subject 600. Another embodiment uses a privacy overlay to mask or otherwise conceal private portions of the electronic information that would otherwise be displayed on the user interface 620. The processing system 120 can generate such a mask can on a pixel-by-pixel or voxel-by-voxel basis, to achieve a similar level of granularity as the selective depiction approach described above. Such privacy features enable manual visual review of the user interface 620 by an agent, without potential privacy violations.

Embodiments of the processing system 120 access the database of reference items 420 and respective reference characteristics 480, such as characteristics of the items as they would be sensed if scanned by the scanning system 160. By comparing the anomaly attributes 400 to the database of reference items 420, the processing system 120 positively identifies known permitted or prohibited items. Accordingly, upon positively identifying an anomaly as a known permitted item, embodiments can suppress indications of the anomaly, because it is not necessary for an agent to manually review the anomaly 360 or initiate other means of further security checks. Such silent resolution of anomalies 360 greatly enhances the speed and efficiency of security checkpoint operations. In other embodiments, the processing system 120 provides a status identifier 560 indicating the anomaly has a pass status that does not need manual agent intervention, or provides an anomaly identifier 520, such as "medical device," that clearly indicates to an agent that no further intervention is needed. Embodiments use similar approaches to positively identify that an anomaly 360 is consistent with various other known reference devices, such as smartphones, keychains, watches, or other permitted items commonly carried by subjects 600. The processing system 120 performs such positive identification of anomalies 360 by using various anomaly attributes 400, such as by analyzing anomaly dielectric constant, anomaly size, and anomaly shape.

In another embodiment, the identity logic 280 of the processing system 120 compares the anomaly attributes 400, from a security scan of the subject 600, to identity information 740 available for that subject 600. The identity logic 280 of the processing system 120 determines an identity of the subject 600 and retrieves, based on the identity, baseline scan data of the subject 600. In an embodiment, the processing system 120 accesses a local server 660 or a remote server 680 to obtain scan data previously obtained for the same subject 600. The processing system 120 determines whether the anomaly attributes 400 are consistent with the baseline scan data previously obtained. If consistent, the processing system 120 clears the indication of the anomaly 360 from the user interface 620, or provides a status identifier 560 indicating a pass status. The processing system 120 also may provide an anomaly identifier 520 corresponding to the matching permitted device 760 as retrieved from the identity information 740 for the subject 600.

In yet another embodiment, the processing system 120 is adapted to communicate with an access device 720. The processing system 120 determines whether all anomalies 360 of a security scan are resolved. If not, the system 120 continues to analyze and attempt to resolve remaining anomalies 360. If any anomalies 360 cannot be resolved, the processing system 120 resorts to manual review by an agent. If all anomalies 360 are resolved, the processing system 120 signals the access device 720 to open. In an embodiment, the processing system 120 waits for a confirmation from an agent performing visual review of the user interface 620, to confirm that any displayed anomalies 360 are visually resolved. The processing system 120, upon receiving the agent confirmation, then directs the access device 720 to open.

Figure 2:
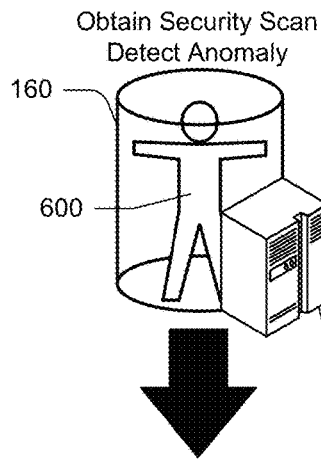
FIG. 2 illustrates identifying anomaly locations in accordance with embodiments and the teachings discussed further in this disclosure.
Figure 2:
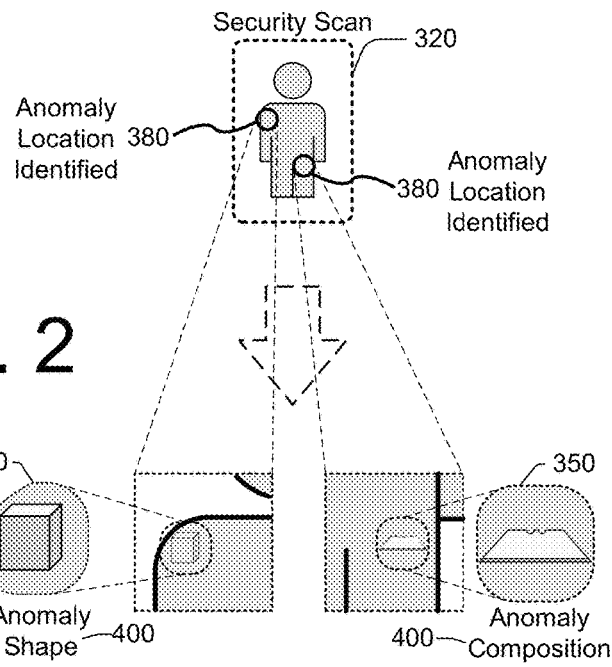

FIG. 2 illustrates identifying anomaly locations 380 according to an embodiment. The scanning system 160 acquires a security scan 320 of the subject 600. The processing system 120 determines whether electronic information of the security scan 320 contains an anomaly. When the electronic information contains an anomaly, the processing system 120 identifies an anomaly location 380 in the electronic information corresponding to the anomaly. As illustrated, the processing system 120 has detected two independent anomalies, and identified their respective anomaly locations 380. In an embodiment, such detection and location identification are performed by ATR processes, as introduced above. The processing system 120 is configured to detect one or more anomalies in the security scan 320, including identifying all anomalies that may be present. The processing system 120 is also configured to detect that no anomalies are present in the security scan 320. In an embodiment, the processing system 120 includes anomaly identifying logic 240 to perform such anomaly identification.

Figure 3:
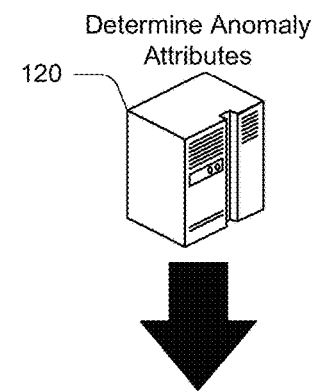
FIG. 3 illustrates determining anomaly attributes in accordance with embodiments and the teachings discussed further in this disclosure.

FIG. 3 illustrates determining anomaly attributes 400 according to an embodiment. The processing system 120 determines a subset of the electronic information 350 corresponding to the anomaly location 380. This allows the processing system 120 to conserve computing resources by performing analysis of only relevant information corresponding to the anomaly, e.g., the subset of the electronic information 350. Such analysis enables the processing system 120 to determine anomaly attributes 400 using the subset of the electronic information 350. In an embodiment, the processing system 120 determines anomaly attributes 400 such as dielectric constant, size, and shape of the anomaly 360 represented in the subset of the electronic information 350. The example anomaly attributes 400 illustrated in FIG. 3 include an anomaly shape similar to a cube, and an anomaly composition similar to a metallic weapon. In an embodiment, the processing system 120 includes anomaly analyzer logic 260 to perform such determinations of anomaly attributes 400.

Figure 4:
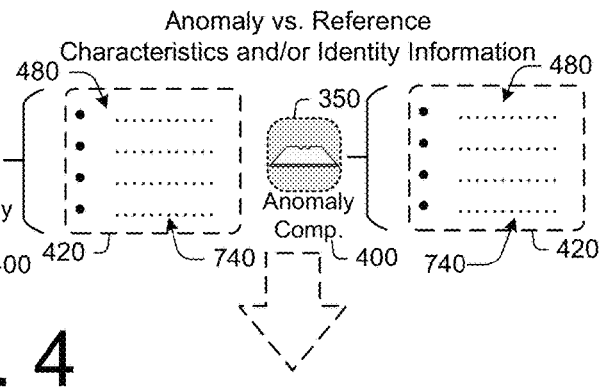
FIG. 4 illustrates evaluating anomaly attributes in accordance with embodiments and the teachings discussed further in this disclosure.

FIG. 4 illustrates evaluating anomaly attributes 400 according to an embodiment. The processing system 120, via anomaly analyzer logic 260, evaluates the anomaly attributes 400 using a database of reference items 420. Details of such evaluation are described in greater detail below with respect to FIG. 6. In brief, the database of reference items 420 includes information that the processing system 120 uses when comparing the anomaly attributes 400 of the anomaly. Such comparisons enable the processing system 120 to determine if the anomaly is consistent with the reference characteristics and match criteria in the database of reference items 420. In an embodiment, the database of reference items 420 includes reference characteristics 480 and identity information 740. The processing system 120 compares the anomaly attributes 400 to the reference characteristics 480 corresponding to reference items, to determine if the anomaly is consistent with a given reference item. In an embodiment, a given reference item, of the database of reference items 420, includes a respective identifier (e.g., "medical device"), respective reference characteristics (e.g., shape, density, size), and a respective match criterion (e.g., which characteristic or characteristics need to match, and how closely). The database of reference items 420 also includes reference characteristics indicating whether their corresponding reference items are permitted items (pass status) or prohibited items (fail status) at a security checkpoint.

In addition to reference characteristics 480, the processing system 120 compares the anomaly attributes 400 to the identity information 740 (e.g., which indicates the characteristics of a medical implant in the subject's right shoulder). Making comparisons using the identity information 740 enables the processing system 120 to determine if the anomaly is consistent with information known about the given subject 600. For example, a given subject 600 may have a specific medical device, which the subject 600 previously has made known to airport security (or has otherwise become available, such as via a database accessible via network 640). Upon scanning the given subject 600, embodiments may initially detect the specific medical device of that subject 600 as an anomaly, positively identify the anomaly as the specific medical device, and silently clear or resolve the anomaly. Such resolution occurs without needing to present an alarm to agents, or otherwise burden agents with manual identification of the specific medical device. In an embodiment, the anomaly analyzer logic 260 of the processing system 120 performs such evaluations of anomaly attributes 400.

Figure 5:
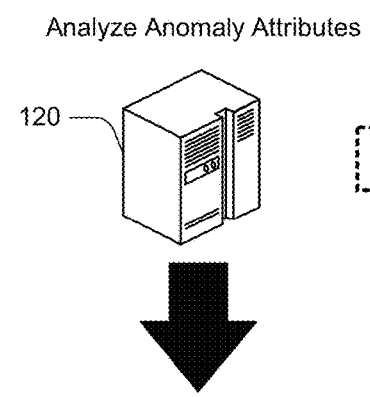
FIG. 5 illustrates outputting anomaly identifiers and status identifiers according to an embodiment.
Figure 5:
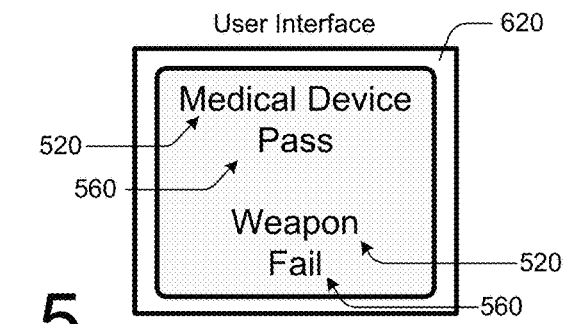

FIG. 5 illustrates outputting anomaly identifiers 520 and status identifiers 560 according to an embodiment. In an embodiment, anomaly depicting logic 300 of the processing system 120 directs a display unit 200 to output, on a user interface 620, identifiers determined to match the anomalies. Such identifiers are output via the user interface 620 and include anomaly identifiers 520 and status identifiers 560. In contrast to the symbolic status identifiers 560 shown in FIG. 1, the status identifiers 560 in the embodiment of FIG. 5 are shown as text indicating "pass" or "fail." The anomaly identifiers 520 correspond to those respective reference identifiers, which the anomaly analyzer logic 260 has selected from the database of reference items 420.

Figure 6:
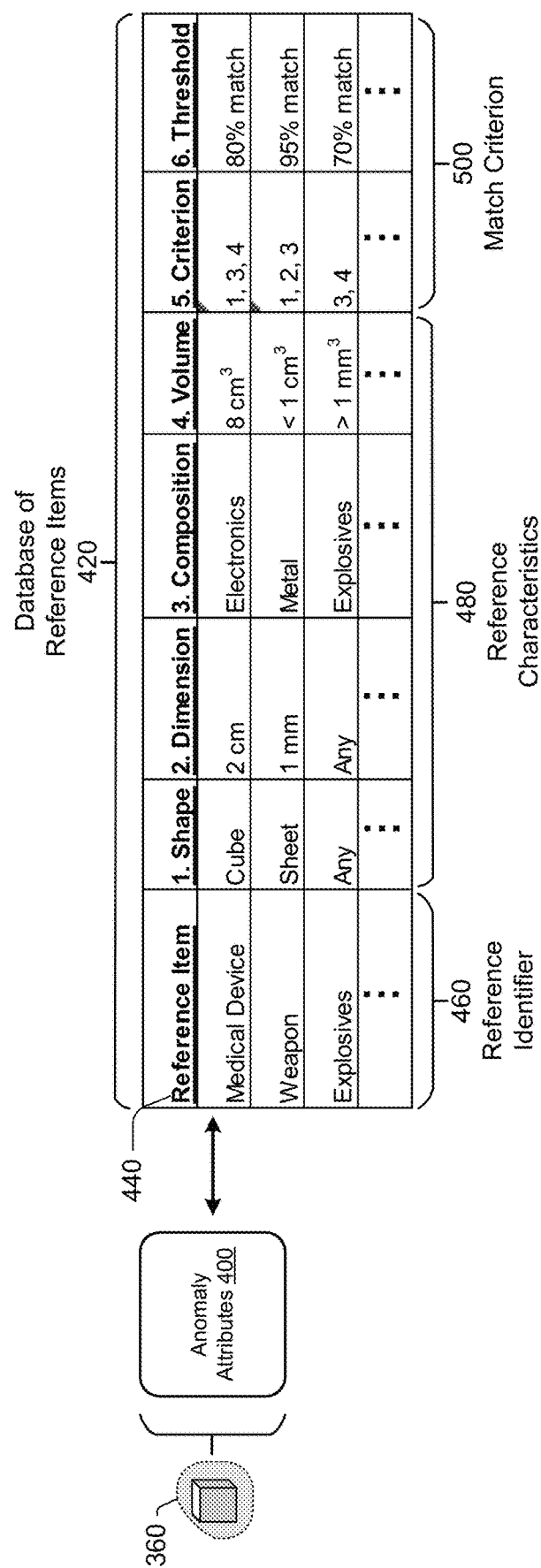
FIG. 6 illustrates a database of reference items in accordance with embodiments and the teachings discussed further in this disclosure.

FIG. 6 illustrates a database of reference items 420 according to an embodiment. The database of reference items 420 includes various information that processing systems 120 use to evaluate anomaly attributes 400 of anomalies 360. More specifically, the database of reference items 420 includes a plurality of reference items 440. A respective reference item 440 includes a reference identifier 460, reference characteristics 480, and a match criterion 500.

The illustrated reference characteristics 480 include shape, dimension, composition, and volume. The illustrated example reference item "medical device" includes a cube shape, a two-centimeter dimension corresponding to an edge of the cube, a composition of electronics, and a volume of eight cubic centimeters. The reference item "weapon" (corresponding to a razor blade) includes a sheet shape, a one-millimeter dimension corresponding a thickness of the sheet, a composition of metal, and a volume of less than one cubic centimeter. In contrast to the medical device and weapon, the reference item "explosives" includes any shape and any dimension, while also including a composition of explosives and a volume of greater than one cubic millimeter. The processing system 120 uses the corresponding respective match criterion 500 to evaluate the anomaly attributes 400 against such reference characteristics 480.

The illustrated match criterion 500 includes a criterion and a threshold. The criterion sets forth which particular reference characteristics 480 for a given reference item 440 are to be compared, when evaluating the anomaly attributes 400. As shown, the criterion for the medical device indicates one, three, and four, corresponding to shape, composition, and volume. Accordingly, the criterion for matching the anomaly attributes 400 to the medical device does not consider the dimension (reference characteristic number two) of the medical device. The criterion for the weapon indicates one, two, and three, corresponding to shape, dimension, and volume. Accordingly, the criterion for matching the anomaly attributes 400 to the weapon does not consider the volume (reference characteristic number four) of the weapon. The criterion for the explosives indicates three and four corresponding to composition and volume. Accordingly, the criterion for matching the anomaly attributes 400 to explosives does not consider the shape or dimension (reference characteristics numbers one and two) of the explosives. The threshold of the match criterion 500 indicates what threshold percentage is needed to be met, in order for the processing system 120 to interpret the comparison as a match. For the medical device, the criterion includes a volume of eight cubic centimeters. However, even if the anomaly attributes 400 indicate an anomaly volume of, e.g., seven cubic centimeters, the processing system 120 would interpret such a volume as a match, because seven is 80% or more of eight. Generally, the threshold provides a degree of control over how strict or lenient the processing system 120 should be when comparing the various reference characteristics 480 as indicated in the criterion of the match criterion 500. As set forth above, the processing system 120 can adjust the strictness and leniency of comparisons, e.g., to meet a desired aggregate security checkpoint throughput.

Figure 7:
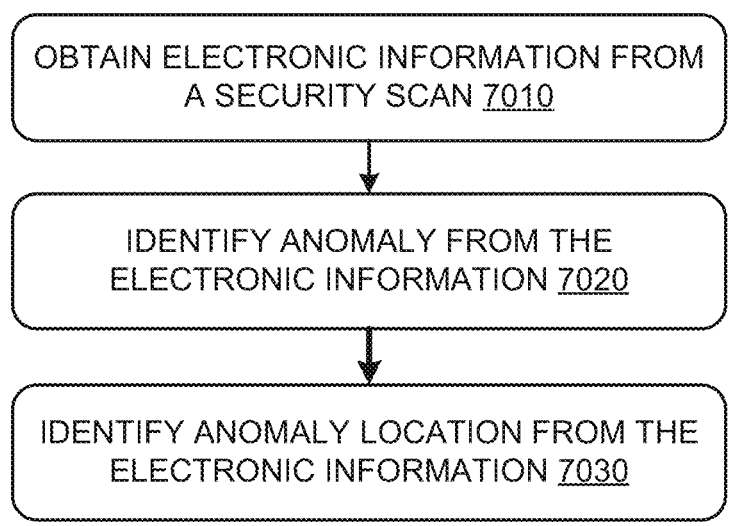
FIG. 7 illustrates a method performed by anomaly identifying logic in accordance with embodiments and the teachings discussed further in this disclosure.

FIG. 7 illustrates a method 7000 performed by anomaly identifying logic 240 according to an embodiment. Obtaining electronic information from a security scan 7010, includes operating a scanning system 160 to perform a single scan of an entirety of the subject 600.

Identifying an anomaly from the electronic information 7020, includes performing an initial quick analysis of the electronic information corresponding to the entire security scan, to determine if shapes or materials might be inconsistent with human tissue, or otherwise unexpected.

Identifying the anomaly location from the electronic information 7030, includes identifying a subset of the electronic information that corresponds to a location of the detected anomaly, for use in further analysis of the subset. Thus, such further analysis does not need to be performed on the entirety of the electronic information from the security scan, as initially obtained in the quick scan.

Figure 8:
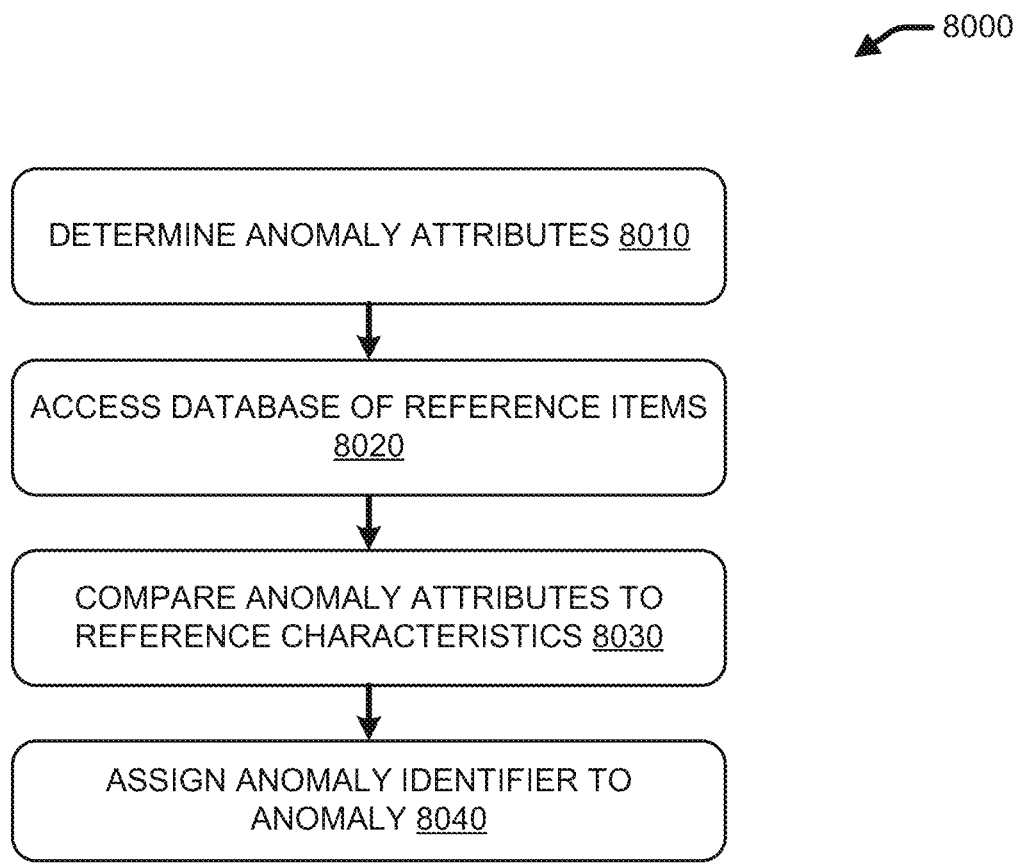
FIG. 8 illustrates a method performed by anomaly analyzer logic in accordance with embodiments and the teachings discussed further in this disclosure.

FIG. 8 illustrates a method 8000 performed by anomaly analyzer logic 260 according to an embodiment. Determining anomaly attributes 8010, includes analyzing the subset of the electronic information from the security scan pertaining to the anomaly location. In an embodiment, the anomaly analyzer logic 260 determines a dielectric constant value of the subset of electronic information, to determine the anomaly's dielectric constant value as an example anomaly attribute.

Accessing the database of reference items 8020, includes communicating, via a network 640, with storage, such as a local server 660 or remote server 680, where a database of reference items 420 is stored.

Comparing the anomaly attributes to reference characteristics 8030, includes making comparisons to check whether anomaly attributes 400, such as the anomaly's dielectric constant value, correspond to one or more reference characteristics 480 stored in the database of reference items 420. In an embodiment, the processing system 120 determines whether the anomaly attributes 400 meet contraband criteria such as an explosive dielectric constant value or a metallic weapon dielectric constant value. In other embodiments, the processing system 120 determines whether the anomaly attributes meet one or more non-threat criteria, such as a volume and composition of a medical device.

Assigning the anomaly identifier to anomaly 8040, includes identifying the anomaly by labeling the anomaly with the identifier found in a matching reference item 440 from the database of reference items 420. In an embodiment, the anomaly attributes 400 are found to meet the match criterion 500 for a known reference item 440 having the reference identifier 460 of "explosives." The processing system 120 assigns the reference identifier 460 "explosives" to the anomaly, as the anomaly identifier 520.

Figure 9:
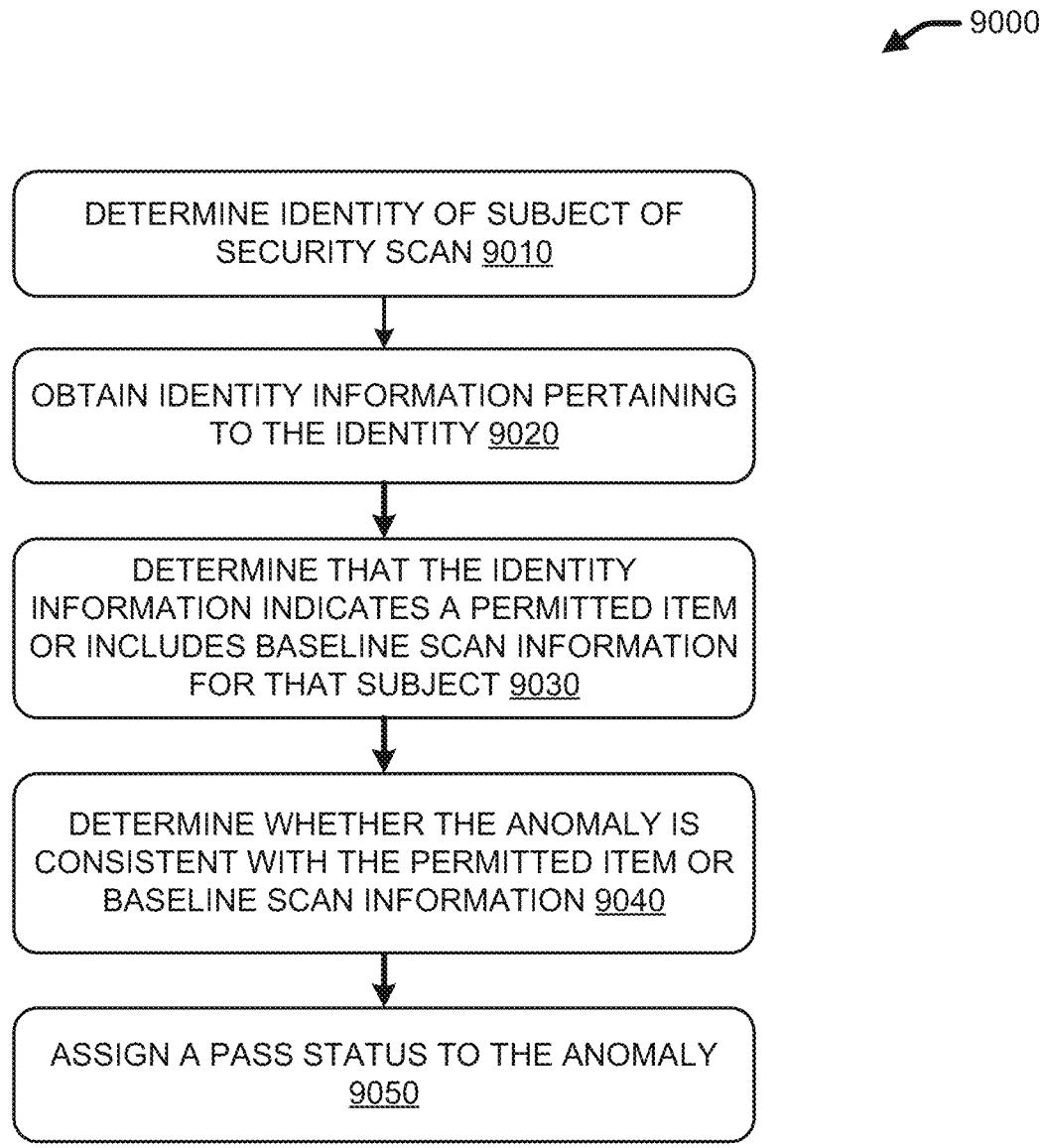
FIG. 9 illustrates a method performed by identity logic in accordance with embodiments and the teachings discussed further in this disclosure.

FIG. 9 illustrates a method 9000 performed by identity logic 280 according to an embodiment. The determining the identity of the subject of security scan 9010, includes confirming an identity of a subject 600, e.g., as provided by a passport or issued identification.

Obtaining the identity information pertaining to the identity 9020, includes accessing stored information about a given subject 600, such as a database of personal information including the subject's gender and information about whether the subject 600 carries an implanted medical device. Such identity information accessible by the processing system 120 includes privacy information, risk-based information, pre-check information, metadata information, medical information, and volunteered information. Such information also includes publicly-available information, or information otherwise obtainable without specific permission from the subject.

Determining that the identity information indicates a permitted item or includes baseline scan information for that subject 9030, includes determining that the identity information 740 for the subject 600 indicates a permitted item. Additionally, the processing system 120 can determine that the identity information 740 include baseline scan information. Such information is associated with the particular subject 600 corresponding to the identity information 740. The permitted item includes medical devices or other aspects of the subject 600 that are typically detected as anomalies, but are confirmed to be permitted. The baseline scan information is specific to the subject 600, and includes corresponding security scan information of the subject, including any particularities of the subject 600 that would otherwise be detected as anomalies.

Determining whether the anomaly is consistent with the permitted item or baseline scan information 9040, includes comparing anomaly attributes of the anomaly to permitted item attributes as stored in the identity information. Similarly, the determining includes comparing the anomaly attributes to electronic information corresponding to the stored baseline scan information for the subject.

Assigning a pass status to the anomaly 9050, includes labeling the anomaly with identifiers that the processing system 120 can output as a status identifier 560, such as a checkmark, text such as "pass," or the like. In another embodiment, the processing system 120 may silently clear the anomaly, and suppress indication of the anomaly entirely, so that an agent reviewing a user interface does not need to review such silently cleared anomalies. The silent suppression of the anomaly is yet another example of a type of pass status assignable to the anomaly.

Figure 10:
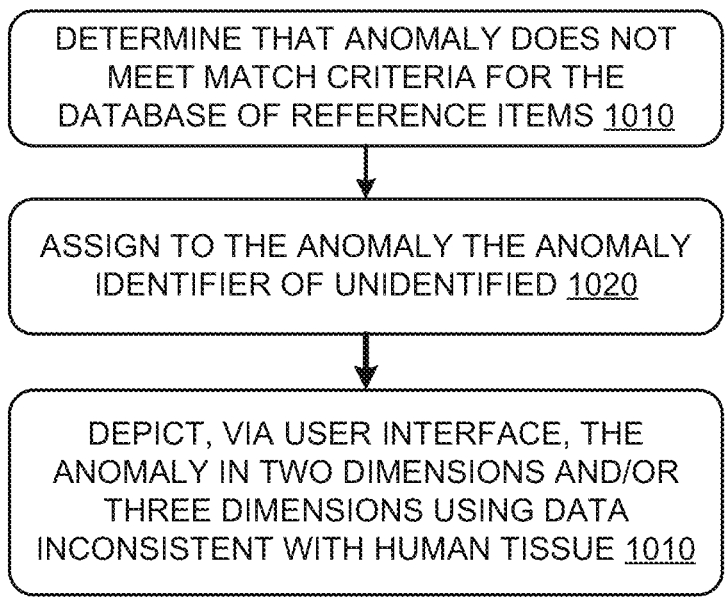
FIG. 10 illustrates a method performed by anomaly depicting logic in accordance with embodiments and the teachings discussed further in this disclosure.

FIG. 10 illustrates a method 1000 performed by anomaly depicting logic 300 according to an embodiment. Determining that anomaly does not meet match criteria for the database of reference items 1010, includes determining that no comparisons between the anomaly attributes 400 and reference characteristics 480 (according to match criteria 500) resulted in an acceptable match. In an embodiment, the processing system 120 performs a pairwise comparison between the anomaly attributes 400 and reference characteristics 480 for each of the reference items 440 in the database of reference items 420. A non-match condition is determined after the processing system 120 performs all comparisons with no match achieved.

Assigning to the anomaly the anomaly identifier of unidentified 1020, includes the processing system 120 labeling the anomaly 360 as unidentified. In an embodiment, the processing system 120 initializes the data structure to store information about the anomaly, and the anomaly identifier is initialized as "not determined." Upon determining that the anomaly attributes for the anomaly do not match the database of reference items, the processing system 120 overwrites the previous "not determined" anomaly identifier with the "unidentified" anomaly identifier.

Depicting, via user interface, the anomaly in two dimensions and/or three dimensions using data inconsistent with human tissue 1010, includes providing a display of the anomaly for visual agent review, without violating the privacy of the subject. In an embodiment, the anomaly depicting logic 300 generates a two-dimensional image based on pixels representing anomaly data that is inconsistent with human tissue, while excluding any pixels consistent with human tissue. The embodiment distinguishes whether data is consistent with human tissue based on, e.g., how similar the dielectric constant value of the data is to human tissue. Such a comparison is achieved by, e.g., the database of reference items 420 including various types of human tissue and associated reference characteristics 480 and match criterion 500. Accordingly, the anomaly depicting logic 300 displays anomalies that are not part of the body of the subject 600, while either discarding (or masking) any body parts of the subject 600. Similarly, the anomaly depicting logic 300 generates three-dimensional depictions of anomalies, by including voxels representing non-human parts of the anomaly data and excluding or masking voxels representing the subject 600.

Figure 11:
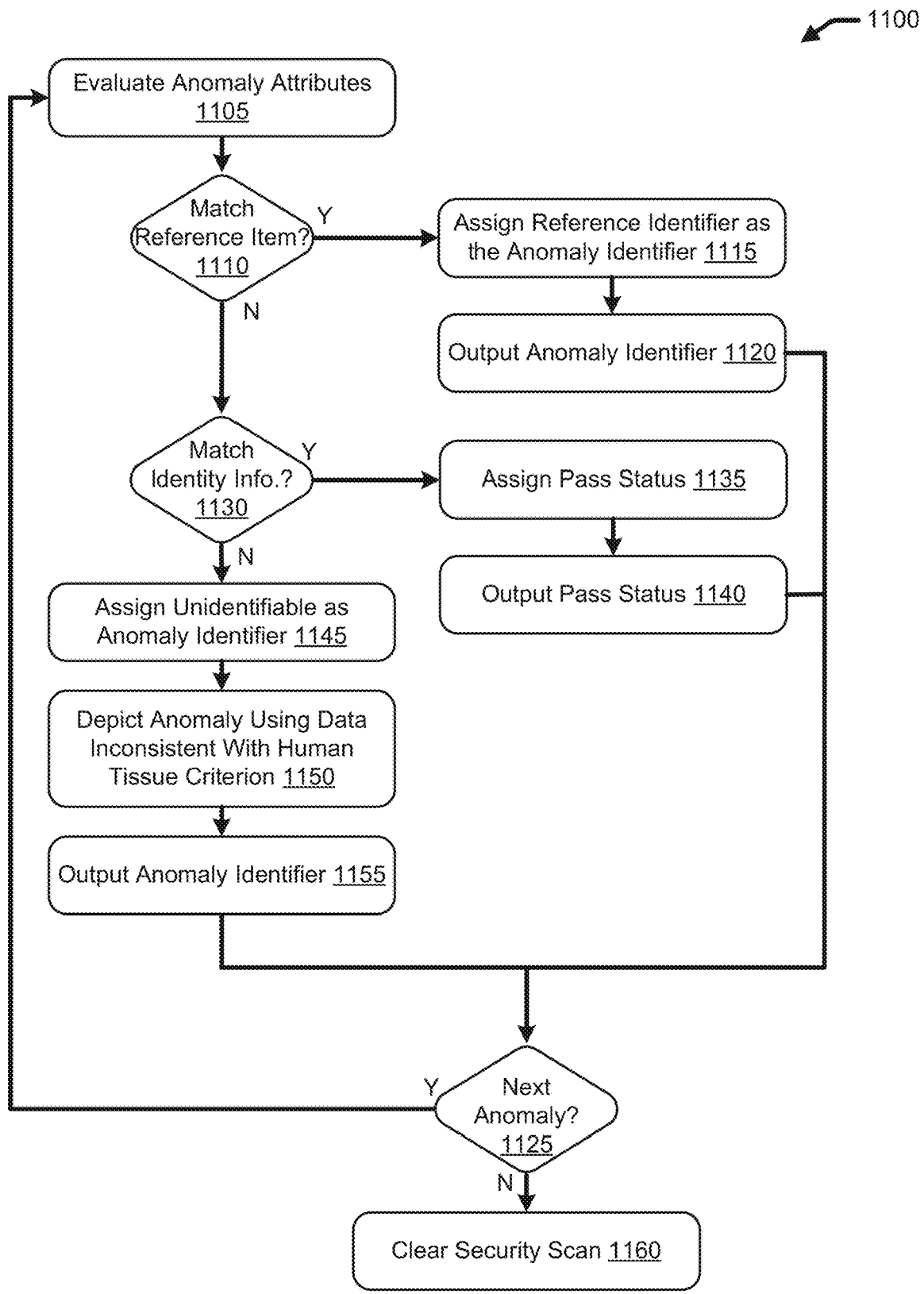
FIG. 11 illustrates a method to evaluate and depict anomalies of a security scan in accordance with embodiments and the teachings discussed further in this disclosure.

FIG. 11 illustrates a method 1100 to evaluate and depict anomalies of a security scan according to an embodiment. In an embodiment, the process of FIG. 11 is carried out by a processing system 120 (e.g., via anomaly analyzer logic 260 and anomaly depicting logic 300) operating on a subset of electronic information representing a security scan. At 1105, (evaluating anomaly attributes) the processing system 120 compares the anomaly attributes to respective reference characteristics of a database of reference items. The processing system 120 evaluates comparisons according to respective match criteria of the database of reference items.

At 1110 (matching to reference items), the processing system 120 evaluates whether the anomaly attributes match any of the reference items in the database of reference items. If yes, process flow proceeds to the assigning reference identifier as the anomaly identifier 1115. At 1115, the processing system 120 assigns the reference identifier of the matching reference item as the anomaly identifier for the anomaly. The processing system then outputs the anomaly identifier at the outputting anomaly identifier 1120, and checks whether any unevaluated anomalies remain at the next anomaly 1125. If not, the security scan is cleared at clear security scan 1160. If unevaluated anomalies remain, flow proceeds back to 1105 to evaluate anomaly attributes.

Returning back to 1110 match reference item, if the anomaly attributes do not match, the flow proceeds to 1130 match identity information, where the processing system 120 evaluates whether the anomaly attributes are consistent with aspects of identity information. The identity information involved in the comparison is specific to the subject 600 of the security scan whose anomaly is being evaluated. In embodiments, the identity information includes characteristics of permitted items known for the subject 600. For example, the processing system uses item characteristics of medical devices or other devices that the particular subject 600 has been permitted to carry through security. The identity information also may include baseline scan information, e.g., as collected directly from a previous scan of the subject 600. The identity information also may include information submitted by the subject 600 in advance, e.g., during registration with an airline, the airport, third-party traveler registration programs, and the like. Such submitted information may include information about the subject 600 that would likely trigger an anomaly, such as an artificial limb, implant, carried item, or other particular characteristics.

If the anomaly attributes match the identity information, flow proceeds to assigning a pass status 1135. The processing system 120 assigns the pass status as a status identifier 560 of the anomaly. Because the pass status is assigned independently of an anomaly identifier 520, embodiments permit anomalies that are not necessarily identified. For example, a subject 600 may include identity information indicating a human tissue abnormality that the subject 600 considers private. Embodiments may verify that anomaly attributes correspond to such identity information, and provide a pass status without needing to generate an anomaly alert. At 1140 outputting pass status, the processing system 120 directs a user interface to display an indication that the anomaly passes, e.g., by overlaying a checkmark on a displayed representation of the subject 600. In other embodiments, the processing system 120 silently clears the anomaly, by outputting the pass status 1140 in the form of automatically suppressing the display of the corresponding anomaly. Accordingly, manual agent review or confirmation of the pass status or corresponding anomaly is not even needed when clearing the subject 600. The flow then proceeds to check for additional anomalies at 1125, clearing the security scan at 1160 if there are no additional anomalies at 1160, or returning to evaluate additional anomalies at 1105 if additional anomalies remain to be evaluated.

Returning back to match identity information 1130, if the anomaly attributes do not match, the flow proceeds to assigning unidentifiable as the anomaly identifier 1145. Such situations may arise when the processing system 120 does not find a match to the anomaly attributes in the database of reference items 420 or the identity information 740.

At 1150 depicting the anomaly using data inconsistent with human tissue criterion, the processing system 120 directs a user interface to display as much of the anomaly as possible without violating the privacy of the subject 600. For example, the processing system 120 distinguishes anomaly characteristics that are inconsistent with human tissue. Such anomaly characteristics might correspond to clothing or items carried by the subject 600. The processing system 120 generates a depiction of such electronic information, corresponding to at least a subset of the electronic information corresponding to the anomaly location that is not human tissue. For example, the processing system 120 distinguishes such subset of electronic information based on a dielectric constant value of the subset of electronic information. The depiction is viewable by an agent performing manual review of a user interface configured to display results of security scans. The processing system also outputs "Unidentifiable" (or other suitable identifier) as an anomaly identifier at output anomaly identifier 1155. Such identifier alerts the agent that manual review is needed to identify the depiction of the unidentifiable anomaly. Flow then proceeds to analyze additional remaining anomalies, if present. If not, flow proceeds to clear the security scan at 1160.

Figure 12:
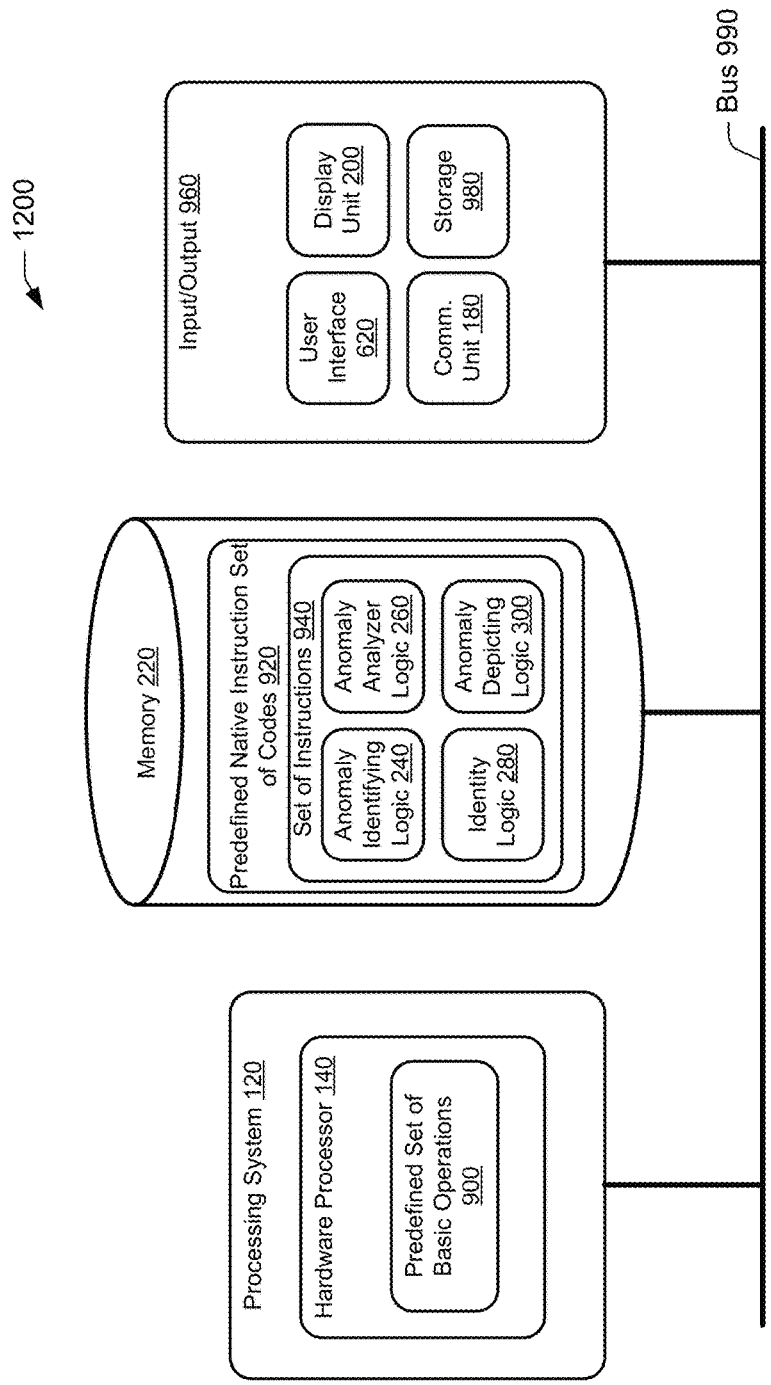
FIG. 12 illustrates a computer system, or apparatus, including logic in accordance with embodiments and the teachings discussed further in this disclosure.

FIG. 12 illustrates a computer system 1200, or apparatus, including logic according to an embodiment. The computer system 1200 includes a processing system 120 having a hardware processor 140 configured to perform a predefined set of basic operations 900 by loading corresponding ones of a predefined native instruction set of codes 920 as stored in the memory 220. Here, the term computer system 1200 includes a processing system such as processing system 120 and a memory such as memory 220 accessible to the processing system 120.

The processing system 120 includes at least one hardware processor 140, and in other examples includes multiple processors and/or multiple processor cores. In one embodiment, a computer system 1200 is a standalone device. The processing system 120 in yet another example includes processors from different devices working together. In embodiments, a computer system 1200 includes multiple processing systems that communicate cooperatively over a computer network.

The following discussion explains how the logic, that implements the foregoing operations, transforms the hardware processor 140 of computer system 1200 into a specially-programmed electronic circuit.

A hardware processor 140 is a complex electronic circuit designed to respond to certain electronic inputs in a predefined manner. The inputs to a hardware processor 140 are stored as electrical charges. The hardware processor 140 interprets the electrical charge of a given memory circuit as having one of two binary values, namely, zero or one.

A given hardware processor 140 has electrical circuitry designed to perform certain predefined operations in response to certain ordered sets of binary values. The electrical circuitry is built of electronic circuits arranged or configured to respond to one set of ordered binary values one way and to another set of ordinary values another way, all in accordance with the hardware design of the particular hardware processor 140. A given set of ordered binary values to which the hardware processor 140 is designed to respond, in a predefined manner, is an instruction.

The collection of valid instructions to which a given hardware processor 140 is designed to respond, in a predetermined manner, is the native instruction set of the processor, also referred to as a native instruction set of codes 920. The native instruction set for one hardware processor may be different from the native instruction set for another hardware processor, depending on their manufacture. To control a given hardware processor, it is necessary to select an instruction or a sequence of instructions from the predefined native instruction set of that hardware processor.

The hardware processor executes a sequence of codes in the implementation of a given task. This is referred to herein as logic. Logic is made up, therefore, not of software but of a sequence of codes or instructions, selected from the predefined native instruction set of codes 920 of the hardware processor 140, and stored in the memory 220.

Returning to FIG. 12, the memory 220 is accessible to the processing system 120 via the bus 990. The processing system 120 also controls the input/output unit 960 via the bus 990. The input/output unit 960 includes controllers for a user interface 620, a display unit 200, a communications unit 180, and storage 980.

The memory 220 includes the predefined native instruction set of codes 920, which constitute a set of instructions 940 selectable for execution by the hardware processor 140. In an embodiment, the set of instructions 940 include anomaly identifying logic 240, anomaly analyzer logic 260, identity logic 280, and anomaly depicting logic 300 as illustrated in FIG.1. Operations of such logic also are set forth above in greater detail with respect to the flowcharts illustrated in FIGS. 7-11.

The anomaly identifying logic 240, anomaly analyzer logic 260, identity logic 280, and anomaly depicting logic 300 is stored in the memory 220 and comprises instructions 940 selected from the predefined native instruction set of codes 920 of the hardware processor 140, adapted to operate with the processing system 120 to implement the process or processes of the corresponding anomaly identifying logic 240, anomaly analyzer logic 260, identity logic 280, and anomaly depicting logic 300.

Conclusion

The various networks are illustrated throughout the drawings and described in other locations throughout this disclosure, can comprise any suitable type of network such as the Internet or a wide variety of other types of networks and combinations thereof. For example, the network 640 may include a wide area network (WAN), a local area network (LAN), a wireless network, an intranet, the Internet, a combination thereof, and so on. Further, although a single network 640 is shown, a network can be configured to include multiple networks.

Computer storage media and/or memory includes volatile and non-volatile, removable and non-removable media and memory implemented in any method or technology for storage of information such as computer readable instructions, data structures, program modules, or other data. Computer storage media include, but are not limited to, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by a mobile device, computer, server, and so forth. For example, instructions embodying an application or program are included in one or more computer-readable storage media, such as tangible media, that store the instructions in a non-transitory manner.

Various techniques are described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media."

Certain attributes, functions, steps of methods, or sub-steps of methods described herein are associated with physical structures or components, such as a module of a physical device, that in implementations in accordance with this disclosure make use of instructions (e.g., computer executable instructions) that are embodied in hardware, such as an application specific integrated circuit, computer-readable instructions that cause a computer (e.g., a general-purpose computer) executing the instructions to have defined characteristics, a combination of hardware and software such as processor implementing firmware, software, and so forth such as to function as a special purpose computer with the ascribed characteristics.

For example, in embodiments a module comprises a functional hardware unit (such as a self-contained hardware or software or a combination thereof) designed to interface the other components of a system such as through use of an API. In embodiments, a module is structured to perform a function or set of functions, such as in accordance with a described algorithm. That this disclosure implements nomenclature that associates a particular component or module with a function, purpose, step or sub-step is used to identify the structure, which in instances includes hardware and/or software that function for a specific purpose. Invocation of 35 U.S.C. § 112(f) will be accomplished through use of ubiquitous and historically-recognized terminology for this purpose. The structure corresponding to the recited function is understood to be the structure corresponding to that function and the equivalents thereof permitted to the fullest extent of this written description, which includes the accompanying claims and the drawings as interpreted by one of skill in the art.

Although the subject matter has been described in language specific to structural features and/or methodological steps, it is to be understood that the subject matter defined in the appended claims is not necessarily limited to the specific features or steps described. Rather, the specific features and steps are disclosed as example forms of implementing the claimed subject matter.

In accordance with some embodiments, information is stored in memory (at least temporarily) during performance of the methods for a variety of reasons. Example rationales include, but are not limited to, data processing convenience, communication convenience, permitting batch validation/review, performing records maintenance, and so on, including combinations thereof.

Although headings are used for the convenience of the reader, these are not to be taken as limiting or restricting the systems, techniques, approaches, methods, or devices to those appearing in any particular section. Rather, the teachings and disclosures herein can be combined or rearranged with other portions of this disclosure and the knowledge of one of ordinary skill in the art. It is the intention of this disclosure to encompass and include such variation.

What is claimed is:

1. A method to obtain identity information and evaluate electromagnetic energy reflection data in view of the identity information, comprising:
   determining whether electronic information of a security scan contains an anomaly;
   when the electronic information contains an anomaly, identifying an anomaly location in the electronic information corresponding to the anomaly;
   determining a subset of the electronic information corresponding to the anomaly location;
   determining anomaly attributes using the subset of the electronic information;
   evaluating the anomaly attributes using a database of reference items, a given reference item having:
     a respective identifier,
     respective reference characteristics, and
     a respective match criterion indicating one or more of the respective reference characteristics;
   making a comparison between the anomaly attributes and the respective reference characteristics of the given reference item;
   when a result of the comparison meets the respective match criterion for the given reference item, assigning to the anomaly the respective identifier as an anomaly identifier;
   determining an identity of a subject of the security scan;
   communicating, by a processing system via a network connection, with a database of a remote server containing stored personal information, to access identity information pertaining to the identity of the subject;
     wherein the identity information includes information about the subject that had been provided by the subject and stored in the database in advance prior to the subject undergoing scanning;
   determining that the identity information indicates a permitted device for that subject;
   determining whether the anomaly is consistent with the permitted device for that subject; and
   when the anomaly is consistent with the permitted device for that subject, assigning to the anomaly a pass status.

2. The method of claim 1, further comprising obtaining the electronic information and the subset of the electronic information from only one security scan.

3. The method of claim 1, further comprising outputting, via a user interface, the anomaly identifier.

4. The method of claim 1, further comprising:
   the given reference item having a respective category, of a set of categories including permitted and prohibited; and,
   assigning to the anomaly a status identifier, based on the respective category of the given reference item, when the result of the comparison meets the respective match criterion.

5. The method of claim 4, further comprising:
   the status identifier corresponding to one of a pass status and a fail status;
   the pass status corresponding to the respective category of permitted; and,
   the fail status corresponding to the respective category of prohibited.

6. The method of claim 5, further comprising directing an access device to open when all anomalies contained in the security scan have respective pass statuses.

7. The method of claim 4, further comprising outputting, via a user interface, the status identifier.

8. The method of claim 1, further comprising:
   the anomaly attributes including one or more of an anomaly shape, an anomaly dimension, an anomaly composition, and an anomaly volume; and,
   the respective reference characteristics including one or more of a reference shape, a reference dimension, a reference composition, and a reference volume.

9. The method of claim 8, further comprising:
   the anomaly dimension including one or more of an anomaly length, an anomaly width, and anomaly height; and,
   the reference dimension including one or more of a reference length, a reference width, and a reference height.

10. The method of claim 1, further comprising the respective match criterion including one or more respective match thresholds for use in evaluating one or more respective comparisons between the anomaly attributes and the respective reference characteristics.

11. The method of claim 1, further comprising the respective match criterion for the given reference item specifying a subset of the respective reference characteristics and the anomaly attributes to be compared; and the evaluating including making the comparison without comparing those reference characteristics and anomaly attributes not specified in the subset of the respective reference characteristics and the anomaly attributes.

12. The method of claim 1, further comprising:
determining that the identity information includes baseline scan information of the subject;
determining whether the anomaly is consistent with the baseline scan information; and,
when the anomaly is consistent with the baseline scan information, assigning to the anomaly a pass status.

13. The method of claim 1, further comprising:
when a result of the comparison does not meet the respective match criterion for the database of reference items:
assigning to the anomaly the anomaly identifier of unidentified; and,
depicting, via a user interface, the anomaly in two dimensions using a part of the subset of the electronic information inconsistent with a human tissue criterion.

14. The method of claim 1, further comprising:
when a result of the comparison does not meet the respective match criterion for the database of reference items:
assigning to the anomaly the anomaly identifier of unidentified; and,
depicting, via a user interface, the anomaly in three dimensions using a part of the subset of the electronic information inconsistent with a human tissue criterion.

15. An apparatus to obtain identity information and evaluate electromagnetic energy reflection data in view of the identity information, comprising:
a computer system, including:
a processing system having a hardware processor adapted to perform a predefined set of basic operations by loading corresponding ones of a predefined native instruction set of codes, the predefined native instruction set of codes constituting a set of instructions selectable for execution by the hardware processor;
a memory accessible to the processing system;
anomaly identifying logic, stored in the memory, comprising instructions selected from the predefined native instruction set of codes of the hardware processor, adapted to operate with the processing system to identify an anomaly and an anomaly location using electronic information of a security scan;
anomaly analyzer logic, stored in the memory, comprising instructions selected from the predefined native instruction set of codes of the hardware processor, adapted to operate with the processing system to:
determine a subset of the electronic information corresponding to the anomaly location;
determine anomaly attributes using the subset of the electronic information;
evaluate the anomaly attributes using a database of reference items, a given reference item having:
a respective identifier,
respective reference characteristics, and
a respective match criterion indicating one or more of the respective reference characteristics;
make a comparison between the anomaly attributes and the respective reference characteristics of the given reference item; and,
when a result of the comparison meets the respective match criterion for the given reference item, assign to the anomaly the respective identifier as an anomaly identifier;
a user interface adapted to output, when the result of the comparison meets the respective match criterion, the anomaly identifier; and
identity logic, stored in the memory, comprising instructions selected from the predefined native instruction set of codes of the hardware processor, adapted to operate with the processing system to:
determine an identity of a subject of the security scan;
communicate, by a communication unit via a network connection, with a database of a remote server containing stored personal information, to access identity information pertaining to the identity of the subject;
wherein the identity information includes information about the subject that had been provided by the subject and stored in the database in advance prior to the subject undergoing scanning;
determine that the identity information indicates a permitted device for that subject;
determine whether the anomaly is consistent with the permitted device for that subject; and
when the anomaly is consistent with the permitted device for that subject, assign to the anomaly a pass status.

16. The apparatus of claim 15, further comprising:
a scanning system, including:
a radio frequency (RF) emitter, under control of the processing system, adapted to emit RF energy toward a subject of the security scan;
a sensing system, under control of the processing system, adapted to sense returned RF energy as the electronic information corresponding to the security scan;
a storing system, under control of the processing system, adapted to store in the memory the electronic information obtained from the sensing system; and
the scanning system being further adapted to acquire the electronic information to determine the anomaly attributes from performance of only one security scan.

17. The apparatus of claim 15, further comprising:
the given reference item having a respective category, of a set of categories including permitted and prohibited;
the anomaly analyzer logic being further adapted to operate with the processing system to assign to the anomaly a status identifier, based on the respective category of the given reference item, when the result of the comparison meets the respective match criterion; and,
the user interface being further adapted to output, when the result of the comparison meets the respective match criterion, the status identifier.

18. The apparatus of claim 17, further comprising an access device adapted to open under control of the processing system when all anomalies contained in the security scan have respective status identifiers corresponding to respective permitted categories.

19. The apparatus of claim 15, further comprising the respective match criterion for the given reference item specifying how to make the comparison, between one or more respective anomaly attributes of the anomaly and one or more corresponding respective reference characteristics of the given reference item, to within one or more corresponding respective match thresholds.

20. The apparatus of claim 15, further comprising the respective match criterion for the given reference item specifying a subset of the respective reference characteristics and the anomaly attributes to be compared; and the anomaly analyzer logic adapted to make the comparison without comparing those reference characteristics and anomaly attributes not specified in the subset of the respective reference characteristics and the anomaly attributes.

21. The apparatus of claim 15, the identity logic being further configured to:
    determine that the identity information includes baseline scan information of the subject;
    determine whether the anomaly is consistent with the baseline scan information; and
    when the anomaly is consistent with the baseline scan information, assign to the anomaly a pass status.

22. The apparatus of claim 15, further comprising:
    anomaly depicting logic, stored in the memory, comprising instructions selected from the predefined native instruction set of codes of the hardware processor, adapted to operate with the processing system to:
    when a result of the comparison does not meet the respective match criterion for any reference items of the database of reference items:
        assign to the anomaly the anomaly identifier of unidentified; and
        depict, via a user interface, the anomaly in two dimensions using a part of the subset of the electronic information inconsistent with a human tissue criterion.

23. The apparatus of claim 15, further comprising:
    anomaly depicting logic, stored in the memory, comprising instructions selected from the predefined native instruction set of codes of the hardware processor, adapted to operate with the processing system to:
    when a result of the comparison does not meet the respective match criterion for any reference items of the database of reference items:
        assign to the anomaly the anomaly identifier of unidentified; and
        depict, via a user interface, the anomaly in three dimensions using a part of the subset of the electronic information inconsistent with a human tissue criterion.

\* \* \* \* \*